United States Patent [19]

Sasaki et al.

[11] 4,410,450

[45] Oct. 18, 1983

[54] PROCESS FOR PRODUCING FLUID CATALYST HAVING GOOD ACTIVITY FROM COARSE CATALYST

[75] Inventors: Yutaka Sasaki; Kunio Mori, both of Yokohama; Kiyoshi Moriya, Kanagawa, all of Japan

[73] Assignee: Nitto Chemical Industry Co., Ltd., Tokyo, Japan

[21] Appl. No.: 278,154

[22] Filed: Jun. 29, 1981

[30] Foreign Application Priority Data

Jun. 30, 1980 [JP] Japan ................... 55-87829

[51] Int. Cl.$^3$ .................. B01J 23/18; B01J 23/92; B01J 27/02; B01J 27/30
[52] U.S. Cl. ................... 502/22; 260/465.3; 502/27; 502/208; 502/215;; 502/216; 502/324; 502/326; 502/353; 502/305; 502/314
[58] Field of Search .................. 252/439, 411 R, 412, 252/413, 416, 432, 435, 437, 462, 467, 471, 472, 476; 260/465.3

[56]  References Cited

U.S. PATENT DOCUMENTS

| | | | |
|---|---|---|---|
| 3,532,734 | 10/1970 | Anderson et al. | 260/465.3 |
| 3,657,155 | 4/1972 | Yoshino et al. | 252/456 |
| 3,716,496 | 2/1973 | Yoshino et al. | 252/439 |
| 4,107,085 | 8/1978 | Sasaki et al. | 252/448 |
| 4,208,303 | 6/1980 | Sasaki et al. | 252/416 X |
| 4,280,928 | 7/1981 | Kirch et al. | 252/432 |
| 4,311,611 | 1/1982 | Sasaki et al. | 252/412 |
| 4,316,856 | 2/1982 | Guttmann et al. | 260/465.3 |

Primary Examiner—W. J. Shine
Attorney, Agent, or Firm—Sughrue, Mion, Zinn, Macpeak, and Seas

[57]  ABSTRACT

A process for producing a fluid catalyst having good activity from a coarse catalyst wherein said fluid catalyst is suitable for oxidation, ammoxidation or oxidative dehydrogenation reaction of hydrocarbons which comprises crushing a fluid catalyst, a greater part of which is composed of particles having a large particle size, to produce finely-divided particles, adjusting the distribution of particle size of said catalyst so that the amount of particles of a size of about 20μ or less is about 30% by weight or less of the total weight of catalyst particles and the amount of particles having a weight average particle size is 90% or less based on the catalyst prior to crushing, and thereafter calcining said catalyst at a temperature of about 500° C. - about 1000° C. under a non-reducing atmosphere.

17 Claims, No Drawings

PROCESS FOR PRODUCING FLUID CATALYST HAVING GOOD ACTIVITY FROM COARSE CATALYST

FIELD OF THE INVENTION

The present invention relates to a process for producing a fluid catalyst having good activity from a coarse catalyst and, in greater detail, to a process for producing a practical fluid catalyst having good activity which is used for reactions of hydrocarbons such as oxidation, ammoxidation or oxidative dehydrogenation. The process comprises crushing a coarse catalyst as a starting material, which can not be put to practical use in its coarse form, to produce finely divided particles, wherein a greater part of the coarse catalyst starting material is composed of particles having a large particle size, classifying the particles to adjust the particle size distribution to a specified range, and calcining the particles under specified conditions.

BACKGROUND OF THE INVENTION

Since reactions of hydrocarbons such as oxidation, ammoxidation or oxidative dehydrogenation, etc., generally generate a large amount of heat of reaction, a fluidized bed from which heat is easily removed is often used for these reactions. In a fluidized reaction, in order to effectively carry out the reaction while keeping the catalyst particles in a good fluidized state, the catalyst should have, of course, good activity and high strength. In addition, it is very important for the catalyst to have a suitable particle size distribution. However, it is inevitable to some degree that the activity of the catalyst is deteriorated by use for a long period of time or if the reaction takes place under unsuitable conditions. In a fluidized reaction, the catalyst particles of a small particle size are scattered during the reaction even if a catalyst having a suitable particle size distribution is used and, consequently, the particle size distribution of the catalyst tends towards a greater particle size with the fluidized state being deteriorated, by which reaction efficiency is reduced.

To counteract these problems, processes to activate catalysts having a reduced activity are described in U.S. Pat. No. 4,049,575 wherein an antimony containing catalyst is calcined after impregnating with or spraying a solution containing catalyst active components, in U.S. Pat. No. 4,208,303 wherein an iron-antimony catalyst is calcined at a specified temperature range under a non-reducing atmosphere, in U.S. patent application Ser. No. 959,810, filed Nov. 13, 1978, now abandoned, wherein the catalyst is calcined after impregnation with or spraying an aqueous solution of nitric acid or nitrate, in British Pat. No. 1,365,096 wherein an antimony-uranium oxide catalyst complex is heated in a non-reducing gas at a temperature of 800° F.-1800° F., in U.S. Pat. No. 4,052,332 wherein a molybdenum catalyst is calcined after impregnation with molybdenum and bismuth, and in U.S. Pat. No. 4,052,333 wherein a molybdenum catalyst is calcined in a steam-air atmosphere at a temperature of 500°-550° C. However, according to these processes, it is not possible to prevent a reduction in reaction efficiency which occurs as a result of a coarsening of the distribution of particle size. Therefore, it has been proposed to effectively produce a catalyst having a small particle size which is then added to the catalyst in the reactor. A process for producing an antimony oxide containing fluid catalyst described in U.S. Pat. No. 4,107,085 is a typical example, wherein the catalyst after spray drying during production is classified and fractions having an undesirable particle size are crushed and circulated to the step prior to spray drying to prepare a catalyst having a desired distribution of particle size. However, if a stricter distribution of particle size of the catalyst to be added is required, it is not only necessary to use stricter spray drying conditions, stricter classifying conditions or stricter crushing conditions in the production of the catalyst but also productivity of the catalyst deteriorates increasing the production cost thereof.

On the other hand, in order to adjust the particle size distribution of the catalyst, industrially a process which comprises taking out the used catalyst from a reactor, removing coarse particles by classification to adjust the distribution of particle size of the catalyst so that it is in a suitable range, and returning the resulting catalyst to the reactor has been used, In this case, however, the removed coarse particles do not have any use. Further, the amount of the catalyst removed is sometimes more than about ⅓ of the catalyst. Accordingly, leaving the coarse catalyst as it is not economical because a great loss arises.

Further, in producing a fluid catalyst, there is a problem how to dispose of the catalyst, when a catalyst having a large particle size which can not be put to practical use is produced because of the use of unsuitable conditions.

The present inventors have developed previously a process for producing an antimony oxide containing fluid catalyst and such is described in Japanese Patent Publication No. 15471/78. Specifically, this process comprises crushing a catalyst which could not be advantageously used for some reason or other to produce particles of a particle size of about 20μ or less and mixing the resulting crushed catalyst with a slurry in a suitable step prior to spray drying during production of the fluid catalyst according to the process described in U.S. Pat. No. 3,657,155 and 3,686,138 by the present inventors so that 50% by weight or less, based on the finished catalyst, is used. However, this process is not always satisfactory because of problems in that a large amount of energy is required for finely crushing the catalyst because the catalyst to be crushed was calcined at a high temperature and has high strength, that equipments such as slurry pumps or nozzles, etc. are extensively abraded in spray drying of a slurry containing the finely crushed catalyst and, consequently, the frequency in replacement of parts of equipment increases, and that the amount of the crushed catalyst to be mixed is restricted and the strength of the finished catalyst is remarkably deteriorated in preparing a catalyst which can not be put to practical use, if the amount of crushed catalyst added exceeds 50% by weight of the total catalyst.

SUMMARY OF THE INVENTION

The purpose of the present invention is to utilize effectively such a coarse catalyst known to be a problem in the prior art.

Accordingly, an object of the present invention is to provide a process for processing a fluid catalyst which is not suitable for practical use, a greater part of which is composed of particles having a large particle size, to convert such a catalyst into a practical fluid catalyst having good activity.

As a result of various studies in order to attain the above described object, the present inventors have found that the above described coarse catalyst can not be reused, as a practical fluid catalyst, if it is merely crushed and adjusted to have a suitable distribution of particle size. Namely, when a catalyst having an adjusted particle size is used in a reaction, the activity thereof is poor and selectively of the desired product is low. Further, when it is used as a makeup catalyst, the fluidized state seems to be improved, but such an improvement is not reflected in reaction efficiency or sometimes a deteriorated reaction efficiency occurs.

However, to our surprise, it has been found that, when a crushed catalyst having a controlled distribution of particle size is calcined in a specified atmosphere at a temperature in a specified range, the activity of the catalyst becomes equal to or higher than that of fresh catalyst and the desired product can be obtained in a high selectivity, whereby the catalyst can be employed practically as a fluid catalyst.

The present invention has been accomplished on the basis of these findings. Accordingly the present invention provides a process for producing a fluid catalyst having a good activity from a coarse catalyst according to the present invention, wherein the fluid catalyst is used for reactions of hydrocarbons such as oxidation, ammoxidation or oxidative dehydrogenation, etc., which comprises crushing a fluid catalyst, a greater part of which is composed of particles having a large particle size (e.g., about 50μ or more), to produce finely divided particles (e.g., less than about 50μ), adjusting the distribution of particle size of the catalyst particles so that the amount of particles having a particle size of 20μ or less is 30% by weight or less of the total weight of catalyst particles and the amount of particles having a weight average particle size (particle size at median (50%) by weight of the total weight of catalyst particles in the particle size distribution) is 90% or less based on the catalyst prior to crushing, and thereafter calcining the catalyst at a temperature of about 500° C. to about 1000° C. in a non-reducing atmosphere.

DETAILED DESCRIPTION OF THE INVENTION

The process of the present invention is appropriate for a fluid catalyst which can be used for carrying out reactions of hydrocarbons such as oxidation, ammoxidation or oxidative dehydrogenation, etc. and, particularly, it is appropriate for a catalyst containing (A) antimony, (B) at least one element selected from the group consisting of iron, cobalt, nickel, manganese, uranium, cerium, tin and copper and, if desired, (C) at least one element selected from the group consisting of manganesium, calcium, strontium, barium, lanthanum, titanium, zirconium, vanadium, niobium, tantalum, chromium, molybdenum, tungsten, rhenium, ruthenium, osmium, rhodium, iridium, palladium, platinum, silver, zinc, cadmium, boron, aluminum, gallium, indium, thallium, silicon, germanium, lead, phosphorus, arsenic, bismuth, sulfur, selenium and tellurium. A preferred catalyst composition is represented by the following empirical formula:

$$Me_aSb_bX_cTe_dQ_eO_f$$

where Me represents at least one element selected from the group consisting of Fe, Co, Ni, Mn, U, Ce, Sn and Cu, X represents at least one element selected from the group consisting of V, Mo and W, and Q represents at least one element selected from the group consisting of Mg, Ca, Sr, Ba, La, Ti, Zr, Nb, Ta, Cr, Re, Ru, Os, Rh, Ir, Pd, Pt, Ag, Zn, Cd, B, Al, Ga, In, Tl, Si, Ge, Pb, P, As, Bi, S and Se; and a, b, c, d, e and f each represent the atomic ratio of the elements in the formula for which they are subscripts, wherein for $a=10$, $b=5-60$ (preferably 5-30), $c=0-5$ (preferably, 0.05-3), $d=0-10$ (preferably, 0.01-5), $e=0-20$ (preferably, 0-10) and $f=$the number of oxygen corresponding to the oxides formed by bonding the above described components.

The use of this type of the above-described catalysts in reactions of hydrocarbons such as oxidation, ammoxidation or oxidative dehydrogenation are described in, for example, U.S. Pat. Nos. 3,542,843, 3,591,620, 3,716,496, 3,988,359, etc.

The fluid catalyst used for the above described reactions has a particle size in a range of about 10μ to about 200μ. The preferable range of particle size depends upon the reaction system. Further, the particle size distribution varies according to the apparatus used or operating conditions employed. In an apparatus with good catalytic efficiency, a catalyst having a comparatively large particle size can be used. However, the apparatus used and the operating conditions are limited to a certain range from the standpoint of economics. Generally, since a catalyst having a smaller particle size shows better contacting efficiency, the distribution of particle size of the catalyst in the reaction system is adjusted so as to maintain operating properties and economics. For example, in an ammoxidation, distribution is adjusted such that a greater part is in the range of about 20μ to about 100μ.

The catalyst to be crushed in the process of the present invention is a coarse catalyst a greater of which is composed of particles having a large particle size of about 50μ or more, particularly about 50 to 200μ. Since the presence of a certain amount of particles having a large particle size sometimes contributes to stabilization of a fluidized bed, it is not necessary for all coarse particles to be eliminated in the fluidized reaction. In the process of the present invention, a catalyst containing about 60% by weight or more of particles having a particle size of 50 to 200μ and about 20% by weight or less of particles having a particle size of 44μ or less can be utilized. Examples of such a catalyst, include a coarse catalyst obtained by classifying a fluid catalyst removed from the reaction system for the above described reason, a catalyst composed of particles having a large particle size which was obtained by mistake during production of the catalyst, or a coarse catalyst which can not be used because practical activity has been destroyed for some reason or other. The classified catalyst may be that wherein the activity is deteriorated by reduction during the reaction or decrease or loss of the catalyst components.

In the process of the present invention, the coarse catalyst is crushed by a suitable crushing apparatus. The crushing does not aim at obtaining a finely divided power but is carried out so that a catalyst having a desired particle size is not effectively obtained. It is possible to use a ball mill, a vibration mill, a rod mill, an impeller breaker, a disk crusher, a roll crusher, a roller mill, a ring roll mill, etc., as the crushing apparatus.

However, the crushed catalyst sometimes contains particles having too small a particle size (about 10μ or less) or particles which were not sufficiently crushed. Where a large amount of fine particles is present in the catalyst, the catalyst is scattered out of the reaction system during the fluidized reaction and, consequently, not only is a fluidized catalytic effect by the fine particles not sufficiently exhibited but also scattered fine particles sometimes cause various difficulties in steps after the reaction. Further, where a large amount of particles having a large particle size is present in the catalyst, a good reaction result is difficult to obtain because of a poor fluidized state as described above. Accordingly, preferably the crushed catalyst is adjusted to a distribution of particle size so that particles of about $20\mu$ or less is about 30% by weight or less, particles of from more than $20\mu$ to $44\mu$ is about 25% by weight or more and the weight average particle size (particle size at median by weight) is 90% or less of the catalyst prior to crushing.

Classification of the fine particles and the coarse particles can be carried out using a dry process or a wet process. Where the amount of ultrafine particles having a particle size of less than $10\mu$ is larger, the classification is preferably carried out using a wet process. Where the wet process classification is employed, precautions must be taken, because catalyst components in certain kinds of catalysts sometimes dissolve in the solvent used. The classified finely divided powder can be effectively utilized according to the process described in Japanese Patent Publication 15471/78 after crushing. The coarse particles are preferably crushed again.

The catalyst wherein the particle size distribution was adjusted to a specified range is then calcined at a high temperature under a non-reducing atmosphere. The suitable examples of non-reducing atmospheres which can be used are air, nitrogen, oxygen, helium, carbon dioxide, etc. Thus the activity of the catalyst is improved. In calcining at a high temperature under a reducing atmosphere, the activity of the catalyst is inversely deteriorated. Further, where calcining is not concluded, the desired product can not be put to practical use as a fluid catalyst, because the selectivity of the catalyst is low and properties of the catalyst are poor. The preferred calcination temperature is in the range of about 500° C. to about 1000° C., more preferably 550° to 900° C. The preferred calcination time is in a range of about 0.5 hours to about 50 hours, more preferably 0.5 to 10 hours. If the calcination temperature is lower than about 500° C., the selectivity of the desired product is hardly improved. If the calcination temperature is higher than about 1000° C., both the activity and properties of the catalyst are deteriorated.

With a catalyst prepared by finely powdering a coarse catalyst having a deteriorated activity and adjusting the particle size distribution thereof, the catalyst may be calcined at a high temperature under a nonreducing atmosphere after the catalyst has been impregnated with an aqueous solution of activators described below and then dried. Thus an activation effect of the catalyst is further improved.

Examples of aqueous solutions of an activator include an aqueous solution of nitric acid or a nitrate, a hydrogen peroxide solution or aqueous ammonia. If desired, the process described in U.S. Pat. No. 4,049,575 can be employed. Namely, an aqueous solution containing a compound of at least one element selected from the group consisting of vanadium, molybdenum and tungsten and a tellurium compound can be used.

The nitric acid can be suitably used in a concentration of about 1 to about 60% and, particularly, 5 to 40%, by weight. It is preferred to use an aqueous solution of ammonium salts, or nitrates of alkali metals or alkaline earth metals or nitrates of lanthanum, cerium, chromium, manganese, iron, cobalt, nickel, copper, silver, zinc, aluminium, bismuth or tellurium, etc. which are dissolved in water to an extent that they do not adversely influence the catalytic activity as the aqueous solution of nitrate. A preferred concentration is in the range of 0.1% to 20% by weight.

A suitable hydrogen peroxide solution is one having a concentration of about 35% to about 60% by weight which is commercially available and can be used directly or with suitable dilution. Particularly, a preferred concentration is 0.5% to 35% by weight.

Aqueous ammonia having a concentration of about 10% to about 30% by weight which is commercially available can be used directly or with suitable dilution. Particularly, a preferred concentration is 0.5% to 20% by weight.

The aqueous solution containing the above described compounds such as a vanadium compound is preferably prepared using water soluble compounds. It is preferred to use vanadic acid and ammonium metavanadate, etc. as vanadium compounds, molybdic acid and ammonium paramolybdate, etc. as molybdenum compounds, and tungstic acid, ammonium paratungstate, etc. as tungsten compounds. A preferred atomic ratio of the above described components (Mo, V, W): Te=1:0.1 to 5.0.

The amount of the aqueous solution containing an activator with which the catalyst is impregnated preferably is in the range of 0.7–1.3 times the pore volume of the catalyst. The impregnation can be easily carried out by a process which comprises spraying the catalyst with the above described impregnating solution while stirring the catalyst or a process which comprises mixing the catalyst with the above described impregnating solution. Precaution must be taken as to the amount of the solution, because a part of the catalyst components sometimes dissolves out resulting in an unsuitable distribution of catalyst components, if the amount of the solution is too large.

A calcination furnace such as a stationary furnace, a tunnel furnace, a rotary kiln or a fluidized furnace, etc. can be used as the apparatus for calcining the catalyst.

Although a meaning of using a high temperature and a non-reducing atmosphere in the present invention is presently not completely clear and while not desiring to be bound, it is presumed to be as follows. Namely, although the crushed catalyst has a low selectivity to the desired product because it has a high reaction rate and a large profound oxidation ability for hydrocarbons because of the activity of the surface freshly appearing as a result of the crushing, the selectivity to the desired product can be ameliorated by calcination at a temperature of about 500° C. to about 1000° C. under a nonreducing atmosphere. Further, by impregnating the catalyst with the aqueous solution of an activator, active reaction sites having a large profound oxidation ability can be destroyed at the same time, by which the activity of the catalyst is improved.

According to the process of the present invention, it is possible to change a coarse catalyst which is not practical and is only considered a waste catalyst into a fluid catalyst having excellent activity capable of practical use again.

Embodiments and effects of the present invention are illustrated specifically below by reference to examples and comparative examples. The present invention, however, is not to be considered to be limited to these examples.

Catalyst Activity Test

Using fluid catalysts of Comparative Examples and Examples prepared as described herein, an ammoxidation reaction of propylene was carried out using a fluidized bed reaction apparatus having a tower diameter of 1.5 inches. The test conditions were as follows:

| Gas Linear Velocity | 8 cm/sec |
|---|---|
| Reaction Pressure | 1 kg/cm$^2$G |
| Reaction Temperature | 450° C. |
| Contact Time | 3–5 sec |
| Feed Gas Molar Ratio | Air/Propylene = 10.5 |
| | Ammonia/Propylene = 1.05 |

The contact time, the yield and the selectivity were determined as follows.

$$\text{Contact Time} = \frac{\text{Volume of Packed Catalyst (l)}}{\text{Gas Feed Rate at Temperature and Pressure under the Reacting Conditions (l/sec)}}$$

Yield of Product (acrylonitrile or Carbon dioxide gas) =

$$\frac{\text{Weight of Carbon in Product}}{\text{Weight of Carbon in Feed Propylene}} \times 100$$

Selectivity for Acrylonitrile =

$$\frac{\text{Yield of Acrylonitrile}}{\text{Total Conversion of Propylene}} \times 100$$

COMPARATIVE EXAMPLE 1

A fresh catalyst before reaction use having a composition represented by the empirical formula Fe$_{10}$Sb$_{25}$Cu$_3$Co$_{0.5}$W$_{0.2}$Mo$_{0.5}$Te$_{1.5}$O$_{76.6}$(SiO$_2$)$_{60}$, which was composed of particles having a particularly coarse particle size as described in Table 1. This coarse fresh catalyst is designated Catalyst A.

COMPARATIVE EXAMPLE 2

Catalyst A was crushed using a vibration mill. The crushed catalyst was suspended in water and classified by settling. Superfine powder of about 20μ or less was removed. The resulting catalyst was dried at 130° C. for 3 hours. This catalyst is designated Catalyst B.

EXAMPLE 1

Catalyst B was calcined at 720° C. in air for 3 hours. This catalyst is designated Catalyst C.

COMPARATIVE EXAMPLE 3

A catalyst having a composition represented by the empirical formula of Fe$_{10}$Sb$_{25}$Cu$_3$Co$_{0.5}$W$_{0.2}$Mo$_{0.5}$Te$_{1.5}$O$_{76.6}$(SiO$_2$)$_{60}$, wherein the activity had been deteriorated by use in ammoxidation of propylene and the particle size had become large as described in Table 1. This coarse deteriorated catalyst is designated Catalyst D.

COMPARATIVE EXAMPLE 4

Catalyst D was crushed, powdered and classified to adjust the distribution of particle size using the same process as in Comparative Example 2. This catalyst is designated Catalyst E.

COMPARATIVE EXAMPLE 5

Catalyst D was calcined at 720° C. in air for 3 hours. This catalyst is designated Catalyst F.

COMPARATIVE EXAMPLE 6

A finely divided catalyst (containing 34% of particles having a particle size of 20μ or less) obtained by crushing Catalyst D using a vibration mill was calcined at 720° C. in air for 3 hours. This catalyst is designated Catalyst G.

COMPARATIVE EXAMPLE 7

A catalyst (the weight average particle size was 92% of that of Catalyst D) obtained by crushing Catalyst D and classifying using the same process as in Comparative Example 2 was calcined at 720° C. in air for 3 hours. This catalyst is designated Catalyst H.

EXAMPLE 2

Catalyst E was calcined at 720° C. in air for 3 hours. This catalyst is designated Catalyst I.

EXAMPLE 3

Catalyst E was well mixed with 32% by weight nitric acid in an amount of 1.0 times the pore volume (0.32 ml/g) to sufficiently permeate the catalyst with the nitric acid. After drying at 130° C. for 16 hours, the catalyst was calcined at 200° C. for 2 hours, at 400° C. for 2 hours and finally at 700° C. for 4 hours. This catalyst is designated Catalyst J.

EXAMPLE 4

Catalyst E was well mixed with a 10% by weight hydrogen peroxide solution in an amount of 0.8 times the pore volume (0.32 ml/g) to sufficiently permeate the catalyst with the hydrogen peroxide solution. After drying at 130° C. for 16 hours, the catalyst was calcined at 200° C. for 2 hours and 400° C. for 2 hours and calcined finally at 700° C. for 4 hours. This catalyst is designated Catalyst K.

EXAMPLE 5

Catalyst E was well mixed with 15% by weight aqueous ammonia in an amount of 1.2 times the pore volume (0.32 ml/g) to sufficiently permeate the catalyst with the aqueous ammonia. After drying at 130° C. for 16 hours, the catalyst was calcined at 200° C. for 2 hours and 400° C. for 2 hours and calcined finally at 700° C. for 4 hours. This catalyst is designated Catalyst L.

EXAMPLE 6

Catalyst E was well mixed with an aqueous solution of a mixture of ammonium paratungstate, telluric acid and copper nitrate (atomic ratio: W:Te:Cu = 1:1:0.5; ammonium paratungstate content: 9.0 g/l) in an amount of 0.96 times the pore volume of the catalyst (0.32 g/l) to sufficiently permeate the catalyst with the solution. After drying at 130° C. for 16 hours, the catalyst was calcined at 200° C. for 2 hours and at 400° C. for 2 hours and calcined finally at 720° C. for 4 hours. This catalyst is designated Catalyst M.

REFERENCE EXAMPLE

A fresh catalyst having a composition represented by the empirical formula Fe$_{10}$Sb$_{25}$Cu$_3$Co$_{0.5}$W$_{0.2}$Mo$_{0.5}$Te$_{1.-}$ $SO_{76.6}(SiO_2)_{60}$, wherein the particle distribution size was appropriate. This catalyst is designated Catalyst N.

Particle size distribution of these catalysts and results of catalyst activity testing of these catalyst are shown in Table 1. From the Examples and Comparative Examples, it can be seen that the present invention shows an excellent synergism effect which can not be obtained by each single processing when a coarse catalyst is subjected to crushing to produce finely divided particles, classifying the particles to adjust the distribution of particle size to a specified range and calcining at a high temperature under a non-reducing atmosphere, by which a fluid catalyst having good activity is obtained from the coarse catalyst. Further, a similar effect is obtained in case of other catalyst compositions.

TABLE 1

| Catalyst | | Particle Size Distribution (wt %) | | | Weight Average Particle Size ($\mu$) |
|---|---|---|---|---|---|
| | | $-20\mu$ | $-44\mu$ | $+88\mu$ | |
| Comparative Example 1 | A | 0 | 5 | 23 | 74 |
| Comparative Example 2 | B | 3 | 30 | 8 | 54 |
| Example 1 | C | 3 | 30 | 8 | 54 |
| Comparative Example 3 | D | 0 | 12 | 24 | 70 |
| Comparative Example 4 | E | 2 | 28 | 10 | 55 |
| Comparative Example 5 | F | 0 | 12 | 24 | 70 |
| Comparative Example 6 | G | 34 | 72 | 1 | 28 |
| Comparative Example 7 | H | 2 | 18 | 17 | 65 |
| Example 2 | I | 2 | 28 | 10 | 55 |
| Example 3 | J | 2 | 28 | 10 | 55 |
| Example 4 | K | 2 | 28 | 10 | 55 |
| Example 5 | L | 2 | 28 | 10 | 55 |
| Example 6 | M | 2 | 28 | 10 | 55 |
| Reference Example | N | 5 | 35 | 10 | 52 |

| Catalyst | $d_1/d_0 \times 100^*$ (%) | Calcination Condition Temperature (°C.) | Time (hrs.) | Total Conversion of Propylene (%) | Yield of Acrylonitrile (%) | Yield of Carbon Dioxide Gas (%) | Selectivity for Acrylonitrile (%) |
|---|---|---|---|---|---|---|---|
| A | — | — | — | 95.6 | 74.3 | 13.1 | 77.7 |
| B | 73 | 130 | 3 | 97.5 | 75.2 | 12.0 | 77.1 |
| C | 73 | 720 | 3 | 96.5 | 77.0 | 10.8 | 79.8 |
| D | — | — | — | 93.5 | 72.1 | 13.7 | 77.1 |
| E | 78.5 | 130 | 3 | 94.3 | 73.0 | 14.1 | 77.4 |
| F | — | 720 | 3 | 94.9 | 73.9 | 13.0 | 77.9 |
| G | 40 | 720 | 3 | Reaction impossible | | | |
| H | 92 | 720 | 3 | 96.1 | 75.0 | 11.2 | 78.0 |
| I | 78.5 | 720 | 3 | 97.1 | 77.2 | 10.6 | 79.4 |
| J | 78.5 | 700 | 4 | 97.8 | 77.5 | 11.0 | 79.2 |
| K | 78.5 | 700 | 4 | 97.9 | 77.8 | 10.9 | 79.5 |
| L | 78.5 | 700 | 4 | 97.8 | 77.8 | 10.6 | 79.6 |
| M | 78.5 | 700 | 4 | 98.2 | 78.1 | 10.4 | 79.5 |
| N | — | — | — | 96.8 | 76.8 | 11.0 | 79.3 |

*$d_0$: Weight average particle size ($\mu$), i.e., particle size at median (50%) by weight of the total weight of catalyst particles in the particle size distribution, prior to crushing (classification)

$d_1$: Weight average particle size ($\mu$), i.e., particle size at median (50%) by weight of the total weight of catalyst particles in the particle size distribution, after crushing (classification)

While the invention has been described in detail and with reference to specific embodiments thereof, it will be apparent to one skilled in the art that various changes and modifications can be made therein without departing from the spirit and scope thereof.

What is claimed is:

1. A process for producing a fluid catalyst having good activity from a coarse catalyst wherein said fluid catalyst is suitable for oxidation, ammoxidation or oxidative dehydrogenation reaction of hydrocarbons which comprises crushing a fluid catalyst, a greater part of which is composed of particles having a large particle size, to produce finely-divided particles, adjusting the distribution of particle size of said catalyst so that the amount of particles of a size of about $20\mu$ or less is about 30% by weight or less of the total weight of catalyst particles and the amount of particles having a weight average particle size (particle size at median (50%) by weight of the total weight of catalyst particles in the particle size distribution) is 90% by weight or less of the total weight of the catalyst particles, and thereafter calcining said catalyst at a temperature of about 500° C.–about 1000° C. under a non-reducing atmosphere.

2. The process according to claim 1, wherein the fluid catalyst comprises (A) antimony and (B) at least one element selected from the group consisting of iron, cobalt, nickel, manganese, uranium, cerium, tin and copper, as essential components, and, if desired, (C) at least one element selected from the group consisting of magnesium, calcium, strontium, barium, lanthanum, titanium, zirconium, vanadium, niobium, tantalum, chromium, molybdenum, tungsten, rhenium, ruthenium, osmium, rhodium, iridium, palladium, platinum, silver, zinc, cadmium, boron, aluminum, gallium, indium, thallium, silicon, germanium, lead, phosphorus, arsenic, bismuth, sulfur, selenium and tellurium.

3. The process according to claim 1, wherein the fluid catalyst composition is represented by the following empirical formula

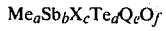

$Me_aSb_bX_cTe_dQ_eO_f$ where Me represents at least one element selected from the group consisting of Fe, Co, Ni, Mn, U, Ce, Sn and Cu, X represents at least one element selected from the group consisting of V, Mo and W, and Q represents at least one element selected from the group consisting of Mg, Ca, Sr, Ba, La, Ti, Zr, Nb, Ta, Cr, Re, Ru, Os, Rh, Ir, Pd, Pt, Ag, Zn, Cd, B, Al, Ga, In, Tl, Si, Ge, Pb, P, As, Bi, S and Se; and a, b, c, d, e and f each represent the atomic ratio, wherein when a is 10, b is 5–60, c is 0–5, d is 0–10, e is 0–20 and f is the number of oxygen corresponding to the oxides formed by bonding the above described components.

4. The process according to claim 1, wherein the fluid catalyst comprises (A) antimony, (B) at least one element selected from the group consisting of iron, cobalt, nickel, manganese, uranium, cerium tin and copper, (C) at least one element selected from the group consisting of vanadium, molybdenum and tungsten and (D) tellurium, as essential components.

5. The process according to claim 1, 2, 3 or 4, wherein the fluid catalyst to be crushed is a catalyst whose activity is deteriorated.

6. The process according to claim 1, 2, 3 or 4, wherein the fluid catalyst to be crushed is a catalyst whose activity is deteriorated and wherein said process includes prior to calcining said catalyst, impregnating said crushed catalyst with an aqueous solution containing an activator and drying said impregnated catalyst.

7. The process according to claim 6, wherein the aqueous solution containing an activator is an aqueous solution of nitric acid or nitrate.

8. The process according to claim 6, wherein the aqueous solution containing an activator is a hydrogen peroxide solution.

9. The process according to claim 6, wherein the aqueous solution containing an activator is aqueous ammonia.

10. The process according to claim 6, wherein the aqueous solution containing an activator is an aqueous solution containing compounds of at least an element selected from the group consisting of vanadium, molybdenum and tungsten and a tellurium compound.

11. The process according to claim 1, wherein the non-reducing atmosphere is air, nitrogen, oxygen, helium, carbon dioxide.

12. The process according to claim 1, wherein said large particle size in the fluid catalyst to be crushed is about 50 to 200μ.

13. The process according to claim 1, wherein the fluid catalyst to be crushed is a catalyst containing about 60% by weight or more of particles having a particle size of 50 to 200μ and about 20% by weight or less of particles having a particle size of 44μ or less.

14. The process according to claim 1, wherein the fluid catalyst crushed contains particles of from more than 20μ to 44μ in the amount of about 25% by weight or more.

15. The process according to claim 1, wherein the calcining is at 550° to 900° C.

16. The process according to claim 1, wherein the calcining is for a period of from about 0.5 hours to about 50 hours.

17. The process according to claim 15, wherein the calcining is for a period of from 0.5 to 10 hours.

* * * * *